Patented Sept. 18, 1934

1,974,180

UNITED STATES PATENT OFFICE 1,974,180

METHOD OF ELIMINATING IRON FROM SULPHATE SOLUTIONS

Arthur Fleischer, Salt Lake City, Utah, assignor, by mesne assignments, to Kalunite Company, a corporation of Delaware No Drawing. Application April 22, 1932, Serial No. 606,902

6 Claims. (Cl. 23—117)

My invention relates to a method of eliminating iron from sulphate solutions and is particularly applicable to solutions containing alumina in the form of sulphate of alumina or alum, such as are obtained in the treatment of ores of alumina for the extraction of their alumina (and alkali metal components, if present).

Many methods for extracting iron from sulphate solutions have been proposed. All of them, as far as I am informed, involve protracted periods of treatment and, for the most part, involve the elimination of the iron from the solution in the form of precipitates which are difficultly filterable.

The object of my invention is to provide a method of eliminating iron from such solutions which will eliminate the iron from the solution in a short period of time, a half-hour being generally sufficient and which will effectually separate the iron without the formation of a colloidal precipitate or other difficultly separable compound.

My invention involves the neutralization of the sulphate solution, by which I mean the adjustment of the solution so that the basic constituent will be present in quantity equivalent to or in excess of the acid constituent. This neutral solution is then treated with dehydrated alunite ore, that is to say, of a calcined ore originally containing the mineral alunite having the composition:

$K_2SO_4.3Al_2O_3.3SO_3.6H_2O$ which has been dehydrated by roasting at temperatures between 450° and 600° C. and for a period sufficient to eliminate its constituent water, ordinarily for 30 minutes at 600° C. This dehydration renders the alumina content of the alunite reactive at least in part for the purpose of my reaction. Alunite ores containing 40% or more of the mineral alunite are well adapted for my use and the reaction between the sulphate solution and the dehydrated alunite is of the base exchange type. In this reaction the indications are clear that the alumina constituent of the dehydrated alunite is replaced by the ferric oxide present in the solution, the alumina of the alunite going into the solution and that there is no change in the structure of the dehydrated alunite used in the reaction. That the reaction is as stated, would also seem to be clear from the fact that visual examination has always shown the complete absence of any basic iron sulphate on the alunite grains, which condition would be readily discernible due to the characteristic color of precipitated basic iron salts.

The dehydrated alunite in the case of an acid solution may be conveniently used as a means of neutralizing the solution and for a neutral solution should be used in such quantity that its reactive alumina content shall be present in at least the proportion of two parts of alumina to one of ferric oxide. The preferable proportion of dehydrated alunite will vary somewhat with the fineness of division of the dehydrated alunite, with the concentration of the ferric oxide, with the concentration of the aluminum sulphate or alum, and with the energy of the stirring. In practice I have effected a substantial elimination of the iron in half an hour and this period can be shortened where a larger percentage of dehydrated alunite is used in the treatment.

If the iron in the solution is present in whole or in part as ferrous iron, it should, for elimination by my process, be oxidized to the ferric state before the treatment of the solution with the dehydrated alunite. As an example of the practical operation of my new process to the treatment of sulphate solution derived from an alunite ore, the ore should first be dehydrated, then leached with a solution of sulphuric acid and potassium sulphate for the conversion of its alumina content into a sulphate and the formation of a solution of potash alum, the alum solution consisting of 20 pounds of iron oxide present as ferric sulphate, 400 pounds of alumina present as potash alum and in the presence of 4000 pounds of water, in addition to the water of crystallization of the alum. The solution being neutral and in a boiling condition, is then energetically stirred with 200 pounds of dehydrated alunite prepared from an ore containing 50% of the mineral alunite ground to —8 mesh for a period of half an hour, with the result of eliminating from the solution substantially all, say, 99%, of its iron component. The solution thus freed from iron must then be separated from the solid material and is in condition for the separation therefrom of a substantially pure and iron free alum.

Having now described my invention, what I claim as new and desire to secure by Letters Patent, is:

1. The method of treating sulphate solutions for the substantially complete elimination therefrom of ferric iron which consists in neutralizing the solution if acid, and treating it with dehydrated alunite to bring about a base exchange reaction between the ferric oxide component of the ferric sulphate and the alumina component of the alunite.

2. The method of claim 1, as applied to solutions of aluminum sulphate.

3. The method of claim 1, as applied to alum solutions.

4. The method of claim 1, as applied to the treatment of solutions containing alum and aluminum sulphate in various proportions.

5. The method of treating ores of aluminum for the preparation therefrom of substantially iron free sulphate solutions which consists in treating the ore to convert its alumina and alkali metal constituent into soluble sulphates, bringing the soluble sulphates into solution by leaching, neutralizing the leached solution and treating the neutral solution with dehydrated alunite to bring about a base exchange reaction between the ferric oxide component of the ferric sulphate and the alumina component of the alunite.

6. The method of claim 5 as applied to alunite ores.

ARTHUR FLEISCHER.